3,097,181
COMPOSITION COMPRISING POLYPYRROLIDONE AND ANOTHER POLYAMIDE
Samuel A. Glickman, Easton, Edgar S. Miller, Bethlehem, and Max E. Chiddix, Easton, Pa., assignors to General Aniline & Film Corporation, New York, N.Y., a corporation of Delaware
No Drawing. Filed Nov. 24, 1959, Ser. No. 855,030
5 Claims. (Cl. 260—42)

This invention relates to new and useful compositions of matter comprising mixtures of polypyrrolidone and polyamide resins of the nylon type.

While the term "polyamide" is inclusive of all polymeric materials which contain recurring amido groups, the term "nylon" is now accepted as a generic expression for those linear superpolyamides which may be fabricated into fibers. For many years from the very beginnings of the nylon industry in the United States and up until very recently, nylon production in this country was almost exclusively the polyamide derived from the condensation of hexamethylenediamine with adipic acid. This yields the so-called Nylon 66. The later illustrates one of the three fundamental methods for obtaining the nylon type products, namely, a condensation between a difunctional amine and a difunctional acid. The second method involves the self-condensation of an amino acid as illustrated by caprolactam which has recently come into prominence in this country, having heretofore been rather more developed in some of the industrial areas of Europe. The polyamide derived from caprolactam (that is, ε-caprolactam) is designated as Nylon 6. In France, there has been developed recently a nylon product derived from an 11 carbon atom amino acid obtained from castor oil. This product is known as Nylon 11. The third major class of nylons is actually a combination of the other two wherein products capable of self-condensation are polymerized with mixtures of diamines and dibasic acids. The possible combinations of diamines and dibasic acids as well as the number of amino acids suitable for condensation reactions is quite large, but from a practical point of view only those mentioned above have reached any degree of prominence due, in the main, to the outstanding physical and chemical characteristics in these products as compared to those made from other diamines and dibasic acids and/or amino acids. This is not to say, however, that for certain specialty items certain other raw materials are not important on an industrial basis. The newest of the nylon type materials to come to the forefront is designated as Nylon 4, and is a product derived from the polymerization of pyrrolidone. Pyrrolidone, which is γ-butyrolactam, is capable of undergoing polymerization to give a superpolyamide. Such polymerization procedures are described in U.S. Patent 2,638,463, and today polypyrrolidone is a well known material.

Those nylon fiber forming materials heretofore used on commercial scale such as Nylon 6 and Nylon 66, and those in general having repeating amido groups separated by at least 4 carbon atoms are characterized as highly hydrophobic materials, which hydrophobic nature manifests itself in poor dyeing characteristics, low water absorption, and high static charge affinity. These are of course undesirable characteristics. While normally low water absorption might be desirable in textile applications, it is deemed to be a failing since by virtue of such property the resultant textile material has the effect of being unduly warm to the wearer, especially during ambient conditions of relatively high temperature and high humidity. It is equally true, of course, that this property of low water absorption may be desirable since such textiles dry rapidly. To date, attempts to improve upon the aforementioned undesirable characteristics of nylon fibers without materially changing the physical characteristics of the fiber have not met with success.

It has now been discovered that nylon compositions containing polypyrrolidone have minimized the above failings of nylon fibers to the point where these failings no longer obtain.

It is an object, therefore, of the present invention to provide improved nylon compositions having outstanding physical and chemical characteristics.

It is another object of this invention to provide new nylon compositions having improved dyeing characteristics.

It is still another object of this invention to provide new nylon compositions having improved and increased water absorption characteristics.

It is a still further object of this invention to provide new compositions comprising nylon having improved antistatic properties.

It is still another object of this invention to provide new compositions of nylon in combination with polypyrrolidone having improved physical and chemical characteristics.

It is still another object of this invention to provide new compositions of nylons with polypyrrolidone having improved dyeability, higher water absorption characteristics, and improved antistatic properties.

It is still another object of this invention to provide new compositions comprising nylons and polypyrrolidone having an improved hand.

It is still another object of this invention to provide new compositions comprising fiber forming linear polyamides having at least 4 carbon atoms repeating in the polymer chain and alternating with amido groups in combination with polypyrrolidones, said compositions being characterized by improved dyeability, improved water absorption, improved antistatic properties, and improved hand.

Other objects will appear hereinafter as the description proceeds.

The polyamides herein contemplated include illustratively:

Polyhexamethylene adipamide
Polyhexamethylene sebacamide
Polyepsilon-aminocaproic acid
Polyepsilon-caprolactam
Copolymers of ethylene diammonium sebacate and epsilon-caprolactam
Interpolymer of hexamethylenediammonium adipate and hexamethylenediammonium sebacate
Polydecamethylene adipamide
Polydecamethylene sebacamide
Interpolymer of hexamethylene adipamide and hexamethylene diglycolamide
Terpolymer of caprolactam hexamethylene adipamide and hexamethylene sebacamide While polypyrrolidone is designated as a polyamide, the mixtures herein comprise polypyrrolidone on the one hand and a different polyamide as the second component, the latter is characterized as a linear superpolyamide having a monomeric chain configuration between the repeating amido groups different from the repeating chain in polypyrrolidone. The preferred polyamides are those having as the major repeating unit between amido groups in the polymer a chain of at least four carbon atoms. Examples of such preferred polyamides are, among others, Nylon 66, Nylon 6, and copolymers, interpolymers and terpolymers having these as the major component thereof. The mixtures for which outstanding properties are evident comprise those wherein the ratio of polypyrrolidone to polyamide range from 1:20 to 100:1. Such mixtures cover the range of polyamides modified with small amounts of polypyrrolidone (at the lower end, 5%) to polypyrrolidone modified with minor amounts of nylon (1%). In the range of 5 to 50% polypyrrolidone based on the weight of the mixture (that is, 1:20 to 1:1), the nylons are modified to yield products having improved dyeing characteristics, modified hand, excellent moisture regain properties, and vastly improved antistatic properties. As the amount of polypyrrolidone becomes predominating, the aforementioned properties and improvements are still in evidence, even more so, and in addition there is a vast improvement in the properties of the polypyrrolidone, especially in so far as fiber forming processes are concerned.

The following examples will serve to illustrate the present invention without being deemed limitative thereof. Unless otherwise indicated, parts are by weight. Relative viscosity referred to in the following examples refers to a 1% solution in metacresol.

*Example 1*

100 parts of powdered polypyrrolidone characterized as having a relative viscosity of 2.189 is blended with 1 part of Nylon 66 (polyhexamethylene adipamide). The blended powders are placed in the melt extrusion apparatus of a Carver press and heated under pressure until melting commences. The pressure is then released for several minutes and the mass is thereafter extruded under pressure. A homogeneous product results. The relative viscosity of the latter is 2.95%. The original Nylon 66 has a relative viscosity of 2.816. The extruded films produced above are dyed in the manner hereinafter described in the following examples.

*Example 2*

A blend is prepared as in Example 1 and from the molten polymer, filaments are formed by extrusion through a ten-hole head. The extruded filaments are cold drawn to ten times their original length to yield oriented textile fibers suitable for making textile materials.

*Example 3*

The procedures of Examples 1 and 2 are repeated employing 100 parts of polypyrrolidone and 6.7 parts of Nylon 66. The resultant homogeneous product has a relative viscosity of 2.964.

*Example 4*

Examples 1 and 2 are once again repeated employing 100 parts of polypyrrolidone and 27 parts of Nylon 66. The homogeneous extruded product has a relative viscosity of 2.956.

*Example 5*

Examples 1 and 2 are again repeated using polypyrrolidone of the same characteristics but in lieu of Nylon 66, there is employed an equal weight of Nylon 6 (polycaprolactam).

*Example 6*

Examples 3 and 4 are repeated using, however, Nylon 6 in place of Nylon 66.

*Example 7*

The films of Example 1 are dyed as follows: 10 g. film of Example 1 is immersed in a dyebath containing 300 mg. of Genacryl Pink 3G (Colour Index, Second Edition, No. Red 14), a cationic basic dyestuff, in 600 mls. of water and held at the boil for 1 hour. Excellent dyeings are obtained. The exhaust from the bath is outstanding, and a wash test (AATCC Wash Test III) shows no loss in color.

*Example 8*

A skein of yarn formed from drawn fibers produced in Example 3 is dyed as in Example 7. The results are comparable, and in addition, the yarn has an excellent hand.

*Example 9*

Example 8 is repeated employing the fibers produced in Example 6. Again, outstanding dyeings are obtained.

*Examples 10–17*

The procedures of Examples 1 and 2 are repeated employing the following proportions of resins:

| Example | Polypyrrolidone | Nylon 66 |
|---|---|---|
| 10 | 100 | 50 |
| 11 | 100 | 100 |
| 12 | 100 | 150 |
| 13 | 100 | 200 |
| 14 | 100 | 400 |
| 15 | 100 | 800 |
| 16 | 100 | 900 |
| 17 | 100 | 1,900 |

*Example 18*

Example 7 is repeated employing a skein of yarn formed from fibers having the compositions of Examples 10–17. Excellent dyeings are produced.

The filaments from the compositions of Examples 14–17 containing from 5 to 20% polypyrrolidone based on the weight of the mixture of resins are readily obtainable may meet extrusion with no discernible degradation at the extrusion temperature. While these products are composed primarily of the hydrophobic nylon material, the presence of the polypyrrolidone yields a much softer, comfortable fabric with better moisture regain characteristics and far less tendency to accumulate static charge than unmodified nylons. The products of Examples 10–13 which contain from 33⅓% to 66⅔% polypyrrolidone are similar to polypyrrolidone in ease of dyeing, antistatic accumulation, moisture regain and hand, and in addition are more readily handled in the extrusion equipment.

The polypyrrolidone which may be employed in the compositions of this invention include any high molecular weight material and in particular, those characterized by relative viscosities (1% in metacresol) of from about 1.5 to 25. The products preferred in fiber-making are those with relative viscosities above about 2.5 The nylon polyamides which are herein contemplated may be, similarly, of varying molecular weights but those which have an intrinsic viscosity of at least about 0.4 are preferred (as defined in U.S. Patent 2,130,948).

In the preparation of films, molding materials, fibers, coating compositions, impregnants and the like the usual fillers, dyes, pigments, plasticizers, anti-oxidants, ultraviolet absorbers, resins, plastics and the like may be employed as additives and/or modifying agents.

In addition to improving the properties of the polyamides of the nylon type herein described, polypyrrolidone may also be used in amounts of from 1% to 50% (based on the weight of the total composition) with other hydrophobic resin materials and particularly those which are adapted to form fibers, filaments and yarns. These include the polyesters, e.g., polyethylene terephthalate (Dacron), the acrylics, i.e., polyacrylonitrile containing materials (e.g., Acrilan, Creslan, Dynel, Orlon, and the like), the polyvinyl resins, e.g., polyvinyl chloride, polyvinylidene chloride, etc., the polyolefins, e.g., polyethylene and polypropylene, cellulose triacetate and the like. Also, these hydrophobic materials may be used to modify polypyrrolidone employing from 1% to 50% by weight (based on the weight of the hydrophobic resin and polypyrrolidone) of polypyrrolidone.

Other variations in and modifications of the described processes which will be obvious to those skilled in the art can be made in this invention without departing from the scope or spirit thereof.

We claim:
1. A composition of matter comprising polypyrrolidone and a polyamide selected from the group consisting of polyhexamethylene adipamide and polyepsilon-caprolactam, the said polypyrrolidone and polyamide being present in the weight ratio of 1:20 to 100:1.

2. A composition of matter comprising polypyrrolidone and polyhexamethylene adipamide, the said polypyrrolidone and polyamide being present in the weight ratio of 1:20 to 100:1.

3. A composition of matter comprising polypyrrolidone and polyepsilon-caprolactam, the said polypyrrolidone and polyamide being present in the weight ratio of 1:20 to 100:1.

4. A composition of matter comprising polypyrrolidone and polyhexamethylene adipamide, the said polypyrrolidone being present in the amount of from about 5% to about 100% by weight based on the weight of the synthetic linear superpolyamide.

5. A composition of matter comprising polypyrrolidone and polyepsilon-caprolactam, the said polypyrrolidone being present in the amount of from about 5% to about 100% by weight based on the weight of the synthetic linear superpolyamide.

References Cited in the file of this patent

UNITED STATES PATENTS

| | | |
|---|---|---|
| 2,339,237 | Brubaker et al. | Jan. 18, 1944 |
| 2,636,873 | Graham | Apr. 28, 1953 |
| 2,638,463 | Ney et al. | May 12, 1953 |
| 2,912,415 | Black et al. | Nov. 10, 1959 |

FOREIGN PATENTS

| | | |
|---|---|---|
| 782,452 | Great Britain | Sept. 4, 1957 |